(12) United States Patent
Toda

(10) Patent No.: US 9,326,259 B2
(45) Date of Patent: Apr. 26, 2016

(54) COMMUNICATION SYSTEM, COMMUNICATION DEVICE, AND COMMUNICATION METHOD

(75) Inventor: Hideyuki Toda, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 142 days.

(21) Appl. No.: 14/125,825

(22) PCT Filed: Jun. 13, 2012

(86) PCT No.: PCT/JP2012/065111
§ 371 (c)(1),
(2), (4) Date: Mar. 28, 2014

(87) PCT Pub. No.: WO2012/173138
PCT Pub. Date: Dec. 20, 2012

(65) Prior Publication Data
US 2014/0198777 A1    Jul. 17, 2014

(30) Foreign Application Priority Data

Jun. 17, 2011 (JP) .................................. 2011-135236

(51) Int. Cl.
*H04J 3/06* (2006.01)
*H04W 56/00* (2009.01)

(52) U.S. Cl.
CPC ........... *H04W 56/001* (2013.01); *H04J 3/0641* (2013.01); *H04W 56/0015* (2013.01); *H04J 3/0667* (2013.01); *H04J 3/0673* (2013.01)

(58) Field of Classification Search
None
See application file for complete search history.

(56) References Cited

U.S. PATENT DOCUMENTS

| 8,279,896 B2 * | 10/2012 | Etkin et al. ..................... 370/503 |
| 2007/0226530 A1 * | 9/2007 | Celinski et al. ............... 713/500 |
| 2009/0228732 A1 * | 9/2009 | Budde et al. ................... 713/400 |

(Continued)

FOREIGN PATENT DOCUMENTS

| JP | 2002-055180 A | 2/2002 |
| JP | 2004-205465 A | 7/2004 |
| JP | 2006-052945 A | 2/2006 |

(Continued)

OTHER PUBLICATIONS

"ISA-100.11a-2009 Wireless systems for industrial automation: Process control and related applications," in 9.1.9.4.7 Duocast transaction, pp. 293-295.

(Continued)

*Primary Examiner* — Frank Duong
(74) *Attorney, Agent, or Firm* — Sughrue Mion, PLLC

(57) ABSTRACT

A communication system comprising first and second master stations configured to perform synchronous wireless communication with a slave station via a first network, and a control station configured to be connected to the first and second master stations via a second network, wherein the control station transmits time information used to synchronize times of the first and second master stations to each of the first and second master stations via the second network, wherein one of the first and second master stations performs timing based on the time information from the control station, and wherein the other of the first and second master stations performs the timing based on announcement information announcing the time information transmitted from the one of the first and second master stations via the first network.

15 Claims, 5 Drawing Sheets

(56) References Cited

U.S. PATENT DOCUMENTS

2011/0110291 A1* 5/2011 Ishii .............................. 370/315
2013/0195010 A1* 8/2013 Enns et al. .................... 370/328

FOREIGN PATENT DOCUMENTS

| JP | 2007-006079 A | 1/2007 |
| JP | 2009-111654 A | 5/2009 |
| JP | 2010-50761 A | 3/2010 |
| WO | 2006097880 A1 | 9/2006 |

OTHER PUBLICATIONS

"IEEE Std 1588-2008 IEEE Standard for a Precision Clock Synchronization Protocol for Networked Measurement and Control Systems," IEEE Instrumentation and Measurement Society, 6.5 PTP device types—6.6 Synchronization overview, pp. 18-37.
International Search Report of PCT/JP2012/065111 dated Jul. 24, 2012.

* cited by examiner

COMMUNICATION SYSTEM, COMMUNICATION DEVICE, AND COMMUNICATION METHOD

TECHNICAL FIELD

The present invention relates to a communication system, a communication device, and a communication method.

This application is a National Stage of International Application No. PCT/JP2012/065111 filed Jun. 13, 2012, claiming priority based on Japanese Patent Application No. 2011-135236, filed Jun. 17, 2011, the contents of all of which are incorporated herein by reference in their entirety.

BACKGROUND ART

In the past, in plants, factories, or the like, distributed control systems (DCSs) in which on-site devices (measurement devices or operation devices) called field devices and a control device controlling the field devices are connected by communication means have been structured to realize advanced automatic operations. Most communication systems which are bases of such distributed control systems perform communication in a wired manner. In recent years, however, communication systems have also been realized that perform communication wirelessly in conformity with a wireless communication standard such as ISA100.11a. Here, the foregoing ISA100.11a is an industrial automation wireless communication standard developed by the International Society of Automation (ISA).

A communication system that conforms to the foregoing wireless communication standard, ISA100.11a, broadly includes a system manager (control station) serving as a control device, a backbone router (master station) connected to the system manager, and a wireless field device (slave station) performing wireless communication with the backbone router. The system manager and the backbone router are connected to an asynchronous communication network called, for example, a backbone network. The backbone router and the wireless field device are connected to a synchronous wireless communication network. The backbone network is realized as a wired communication network in some cases and as a wireless communication network in other cases.

The following Non-Patent Document 1 discloses a communication system in which a time-division multiplexing communication scheme is used as a communication scheme between master stations and slave stations, a plurality of master stations are installed separately (installed redundantly), and the plurality of master stations simultaneously receive signals transmitted from a plurality of slave stations, thereby ensuring a delay time with high reliability. Further, the following Non-Patent Document 2 discloses a method of synchronizing times with high accuracy between devices on a network such as Ethernet (registered trademark) in which a delay time varies considerably. The following Patent Documents 1 and 2 disclose technologies for avoiding fluctuation in transmission delay inherent to a wireless local area network (LAN) in a wireless LAN standard such as IEEE 802.11. Further, the following Patent Document 3 discloses a technology for performing time synchronization directly between a plurality of master stations when the master stations that perform communication in a time-division multiplexing communication scheme coexist.

PRIOR ART DOCUMENTS

Patent Documents

[Patent Document 1]
Japanese Unexamined Patent Application, First Publication No. 2010-50761
[Patent Document 2]
Japanese Unexamined Patent Application, First Publication No. 2009-111654
[Patent Document 3]
Japanese Unexamined Patent Application, First Publication No. 2007-6079

Non-Patent Documents

[Non-Patent Document 1]
"ISA-100.11a-2009 Wireless systems for industrial automation: Process control and related applications," in 9.1.9.4.7 Duocast transaction
[Non-Patent Document 2]
"IEEE Std 1588-2008 IEEE Standard for a Precision Clock Synchronization Protocol for Networked Measurement and Control Systems," in IEEE Instrumentation and Measurement Society, 6.5 PTP device types—6.6 Synchronization overview

DISCLOSURE OF INVENTION

Problems to be Solved by the Invention

In a communication system including a plurality of master stations as in the communication system disclosed in the foregoing Non-Patent Document 1, however, it is necessary to synchronize times of the master stations with high accuracy. In the communication system disclosed in the foregoing Non-Patent Document 1, the times of the master stations are synchronized by allowing a control station to transmit a plurality of pieces of time information via a backbone network and allowing each of the master stations to perform timing based on the time information.

In recent years, to reduce cost, general-purpose protocols such as a network time protocol (NTP) have been used in some cases as means for synchronizing times using general-purpose devices (for example, routers or hubs) used as devices forming a backbone network in Ethernet (registered trademark) or the like. When such general-purpose devices or the like are used, synchronization accuracy may deteriorate. Therefore, it is necessary to improve the synchronization accuracy of the master stations using the method disclosed in, for example, the foregoing Non-Patent Document 2. However, when the method disclosed in Non-Patent Document 2 is used, the cost reduction advantage obtained using general-purpose devices may not be obtained, and thus cost may in fact increase. The cost includes, for example, a total cost associated with design of a backbone network, selection of devices, installation work, setting, experiment, and maintenance in addition to the prices of the devices.

When the backbone network is realized as a wireless communication network, fluctuation in transmission delay occurs in many cases. For example, in a wireless LAN such as IEEE 802.11, large fluctuation in transmission delay caused due to Carrier Sense Multiple Access/Collision Avoidance (CSMA/CA) used in a communication protocol mainly occurs. When the fluctuation in the transmission delay occurs, it is difficult to synchronize times of master stations with high accuracy. Here, when the methods disclosed in the foregoing Patent Documents 1 and 2 are used, the fluctuation in the transmission delay inherent to a wireless LAN can be considered to be avoidable. However, an increase in cost is unavoidable.

The present invention provides a communication system, a communication device, and a communication method capable of synchronizing times of a plurality of master stations with high accuracy without a considerable increase in cost.

Means for Solving the Problems

According to an aspect of the present invention, a communication system is provided, including: first and second master stations configured to perform synchronous wireless communication with a slave station via a first network; and a control station configured to be connected to the first and second master stations via a second network. The control station transmits time information used to synchronize times of the first and second master stations to each of the first and second master stations via the second network. One of the first and second master stations performs timing based on the time information from the control station. The other of the first and second master stations performs the timing based on announcement information announcing the time information transmitted from the one of the first and second master stations via the first network.

In the aspect of the present invention, the timing of the one of the first and second master stations is performed based on the time information from the control station. The timing of the other of the first and second master stations is performed based on the announcement information transmitted from the one of the first and second master stations via the first network.

In the communication system, when the first and second master stations receive the time information from the control station, the first and second master stations may transmit the announcement information to the second and first master stations via the first network, respectively, and receive the announcement information transmitted from the second and first master stations via the first network, respectively.

In the communication system, the first and second master stations may transmit reception quality information indicating reception quality of the announcement information transmitted from the second and first master stations via the first network, respectively, to the control station via the second network. Based on the reception quality information from the first and second master stations, the control station may instruct the first and second master stations to serve as a master that performs the timing based on the time information from the control station or to serve as a slave performing the timing based on the announcement information.

In the communication system, when the other of the first and second master stations does not receive the announcement information from one of the first and second master stations, the other of the first and second master stations may perform the timing based on the time information from the control station.

In the communication system, when the other of the first and second master stations is not able to receive the announcement information from the one of the first and second master stations during a time determined according to a time error occurring when the timing is not performed and time accuracy obtained in advance, the other of the first and second master stations may perform the timing based on the time information from the control station.

The communication system may further include a relay device configured to relay communication performed via the first network between the first and second master stations.

According to another aspect of the present invention, a communication device is provided, including: a first communication unit configured to be connected to a first network in which synchronous wireless communication is enabled; a second communication unit configured to be connected to a second network in which asynchronous communication is enabled; a clock device configured to regulate a time of the own communication device; and a synchronization-processing unit configured to perform one of a first process of performing timing of the clock device based on time information received by the second communication unit and a second process of performing the timing of the clock device based on announcement information of the time information received by the first communication unit, the announcement information being information announced by another communication device via the first network.

In the communication device, the synchronization-processing unit may perform one of the first and second processes based on instruction information received by the second communication unit.

In the communication device, when the instruction information received by the second communication unit is information for instruction of the second process and the first communication unit is not able to receive the announcement information, the synchronization-processing unit may perform the first process instead of the second process.

According to still another aspect of the present invention, a communication method is provided in a communication system including first and second master stations configured to perform synchronous wireless communication with a slave station via a first network, and a control station configured to be connected to the first and second master stations via a second network. The communication method includes: transmitting time information used to synchronize times of the first and second master stations from the control station to each of the first and second master stations via the second network, performing, by one of the first and second master stations, timing based on the time information from the control station, and performing, by the other of the first and second master stations, the timing based on announcement information announcing the time information transmitted from the one of the first and second master stations via the first network.

The communication method may further include transmitting the announcement information to the second and first master stations via the first network, respectively, and receiving the announcement information transmitted between the second and first master stations via the first network, respectively, when the time information is received from the control station.

The communication method may further include transmitting respective reception quality information indicating reception quality of the announcement information transmitted from the second and first master stations via the first network, to the control station via the second network; and instructing, based on the reception quality information from the first and second master stations, the first and second master stations to serve as a master that performs the timing based on the time information from the control station or to serve as a slave performing the timing based on the announcement information.

The communication method may further include, performing, by the other of the first and second master stations, the timing based on the time information from the control station when the other of the first and second master stations does not receive the announcement information from one of the first and second master stations.

The communication method may further include performing, by the other master station, the timing based on the time information from the control station, when the other of the first and second master stations is not able to receive the announcement information from the one of the first and second master stations during a time determined according to a time error occurring when the timing is not performed and time accuracy obtained in advance.

The communication method may further include relaying communication performed via the first network between the first and second master stations.

Effects of the Invention

According to the present invention, the timing of one of the first and second master stations is performed based on the time information from the control station and the timing of the other of the first and second master stations is performed based on the announcement information transmitted from the one of the first and second master stations via the first network. Therefore, in the communication system according to this embodiment, it is also possible to synchronize the times of the plurality of master stations with high accuracy without a considerable increase in cost.

EMBODIMENTS FOR CARRYING OUT THE INVENTION

Hereinafter, a communication system, a communication device, and a communication method according to embodiments of the present invention will be described in detail with reference to the drawings.

First Embodiment

Figure 1:
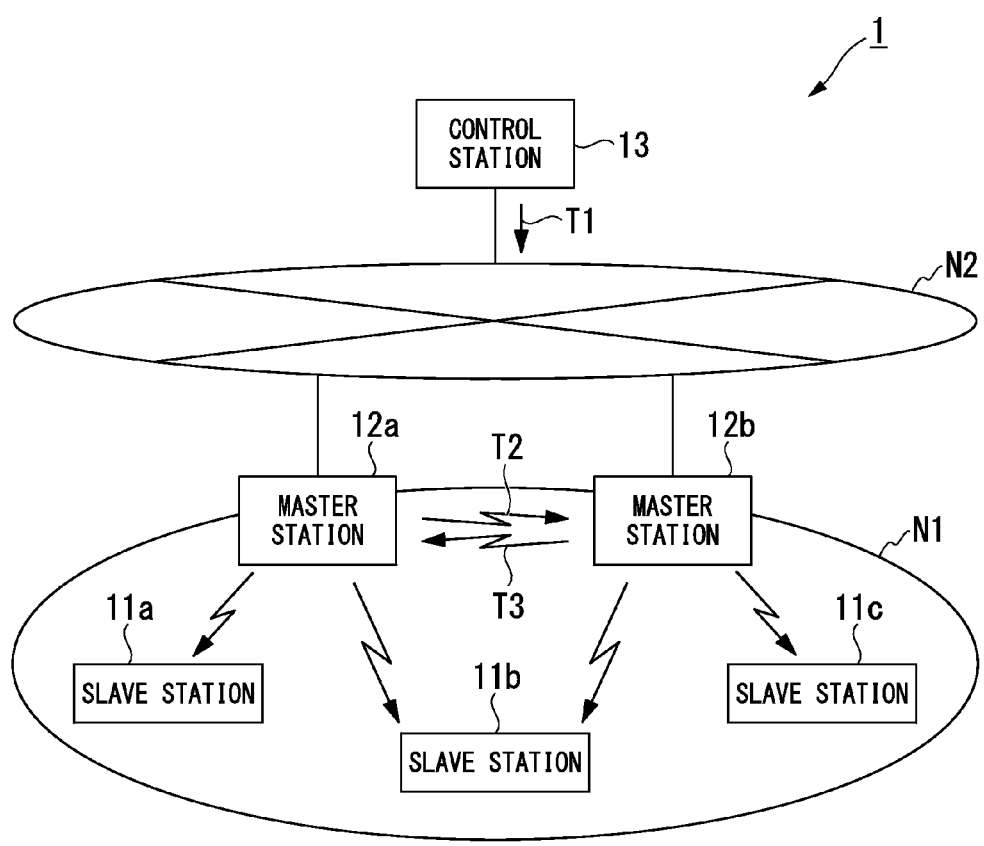
FIG. 1 is a diagram illustrating an overall configuration of a communication system in accordance with a first embodiment of the present invention.

FIG. 1 is a diagram illustrating an overall configuration of a communication system in accordance with a first embodiment of the present invention. As illustrated in FIG. 1, a communication system 1 according to this embodiment includes a plurality of slave stations 11a to 11c, a plurality of master stations 12a and 12b (which are communication devices and first and second master stations), and a control station 13. The communication system 1 is a system which performs communication between the slave stations 11a to 11c and the master stations 12a and 12b under the control of the control station 13. In FIG. 1, three slave stations 11a to 11c are illustrated, but any number of slave stations may be used. The number of master stations 12a and 12b is not limited to two, but three or more master stations may be used.

The slave stations 11a to 11c are wireless field devices which are installed in a plant or a factory, such as sensor devices such as flow meters or temperature sensors, valve devices such as flow rate control valves or on-off valves, or actuator devices such as fans or motors, and perform wireless communication in conformity with a wireless communication standard such as ISA100.11a. For example, the slave stations can perform synchronization wireless communication such as wireless communication according to a time division multiplexing communication scheme and a wireless communication according to a frequency-hopping scheme. Operations of the slave stations 11a to 11c are controlled based on control data transmitted from the master stations 12a and 12b. Data (for example, measurement data) obtained by the slave stations 11a to 11c is transmitted to the master stations 12a and 12b.

The master stations 12a and 12b can perform wireless communication in conformity with a wireless communication standard such as the foregoing ISA100.11a. For example, the master stations 12a and 12b perform various kinds of communication with the slave stations 11a to 11c by forming a wireless communication network N1 (first network) in which wireless communication can be performed according to a time-division multiplexing communication scheme. The master stations 12a and 12b are also connected to a backbone network N2 (second network) and perform various kinds of communication with the control station 13 via the backbone network N2.

Here, the plurality of master stations 12a and 12b are provided to improve tolerance against a wireless path failure or multi-pass fading by allowing the master stations 12a and 12b to simultaneously receive signals transmitted from the slave stations 11a to 11c. Further, the wireless communication network N1 in which the synchronization wireless communication such as the wireless communication according to the time-division multiplexing communication scheme can be performed is formed to ensure communication bands and delay times between the slave stations 11a to 11c and the master stations 12a and 12b.

The master stations 12a and 12b perform a process of synchronizing times based on time information T1 when the time information T1 used to synchronize times is transmitted from the control station 13 via the backbone network N2. Specifically, one (for example, the master station 12a) of the master stations 12a and 12b performs timing based on the time information T1 from the control station 13 and the other master station (for example, the master station 12b) performs timing based on announcement information (information used to announce time information from the control station 13: for example, announcement information T2) transmitted from the one station (for example, the master station 12a) via the wireless communication network N1. The details of the master stations 12a and 12b will be described below.

The control station 13 performs various kinds of control such that communication is normally performed between the slave stations 11a to 11c and the master stations 12a and 12b. For example, frequency channel allocation control, time slot allocation control, authentication control, and management of encryption keys in the wireless communication network N1 are performed. The communication system 1 according to this embodiment includes the plurality of master stations 12a and 12b, and thus performs various kinds of synchronization control at the time of synchronization of times of the master stations 12a and 12b. Specifically, control is performed to transmit the time information T1 indicated by a clock device (not illustrated) of high accuracy included in the own communication system 1 to each of the master stations 12a and 12b via the network N2.

The backbone network N2 to which the master stations 12a and 12b and the control station 13 are connected is, for example, a network formed of general-purpose devices such as routers or hubs used in Ethernet (registered trademark) or the like and in which asynchronous communication is performed. Here, the backbone network N2 is formed using the general-purpose devices mainly to reduce the entire cost of the communication system 1.

Figure 2:
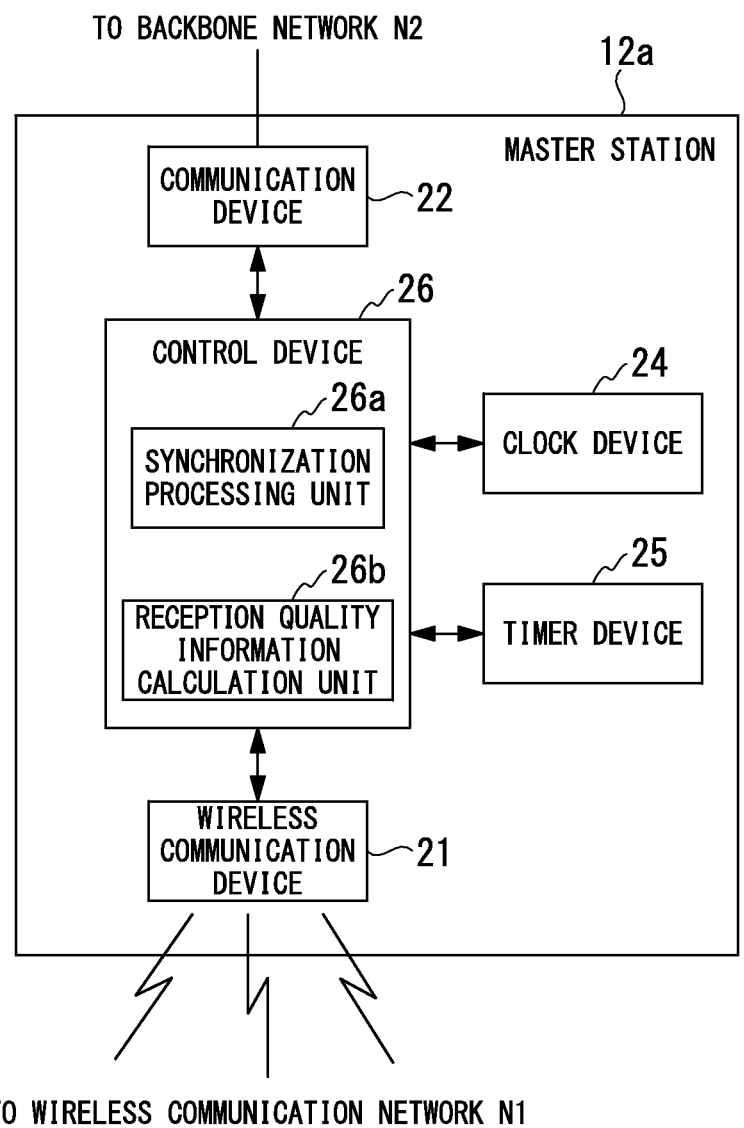
FIG. 2 is a block diagram illustrating the configuration of main units of a master station serving as a communication device in accordance with the first embodiment of the present invention.

Next, the details of the master stations 12a and 12b will be described. FIG. 2 is a block diagram illustrating the configuration of main units of the master station serving as a communication device in accordance with the first embodiment of the present invention. Since the master stations 12a and 12b have the same configuration, only the master station 12a will be described here. As illustrated in FIG. 2, the master station 12a includes a wireless communication device 21 (first communication unit), a communication device 22 (second communication unit), a clock device 24, a timer device 25, and a control device 26.

The wireless communication device 21 is connected to the wireless communication network N1 and performs synchronization wireless communication with the slave stations 11a to 11c. The communication device 22 is connected to the backbone network N2 and performs asynchronous communication with the control station 13 via the backbone network N2. The clock device 24 is a device that regulates a time of the master station 12a and performs reading of a current time or timing under the control of the control device 26. The timer device 25 measures a time designated by the control device 26 under the control of the control device 26.

The control device 26 generally controls the master station 12a by controlling the wireless communication device 21 to the timer device 25 illustrated in FIG. 2. For example, the communication with the slave stations 11a to 11c via the wireless communication network N1 is controlled by controlling the wireless communication device 21 and communication with the control station 13 via the backbone network N2 is controlled by controlling the communication device 22.

The control device 26 includes a synchronization-processing unit 26a and a reception quality information calculation unit 26b. The synchronization-processing unit 26a performs timing (a synchronization process) of the clock device 24. Specifically, the synchronization-processing unit 26a performs one of a first process of performing timing of the clock device 24 based on the time information T1 (the time information T1 from the control station 13) received by the communication device 22 and a second process of performing the timing of the clock device 24 based on announcement information T3 (announcement information T3 announced by the master station 12b via the wireless communication network N1 and received by the wireless communication device 21).

The synchronization-processing unit 26a performs a process of performing the timing of the clock device 24 based on the foregoing time information T1, when instruction information indicating that the master station will serve as a master is transmitted from the control station 13. On the other hand, the synchronization-processing unit 26a performs a process of performing the timing of the clock device 24 based on the foregoing announcement information T3 when instruction information indicating that the master station will serve as a slave is transmitted from the control station 13.

Here, the "master" refers to a master station which will perform the timing based on the time information T1 from the control station 13 and the "slave" refers to a master station which will perform the timing based on the announcement information from the master. Further, when the instruction information indicating that the master station will serve as the slave is transmitted from the control station 13 but the announcement information from the master is not received, the timing is performed in some cases based on the time information T1 from the control station 13.

The reception quality information calculation unit 26b calculates reception quality information indicating reception quality of the announcement information T3 received by the wireless communication device 21. Specifically, the reception quality information calculation unit 26b calculates the reception quality information of which a value is considerably changed according to whether the announcement information T3 is received by the wireless communication device 21 and a value is changed according to a magnitude of reception power or an error rate when the announcement information T3 is received. For example, when the reception quality information has a value of 0% to 100%, the reception quality information calculation unit 26b calculates the reception quality information of which the value is assumed to be 0% at the time of no reception of the announcement information T3 and the value is changed within a range of ±30% according to the magnitude of the reception power and the error rate by setting the value of 70% as a criterion at the time of the reception of the announcement information T3. The calculated reception quality information is transmitted to the control station 13 under the control of the control device 26.

Figure 3:
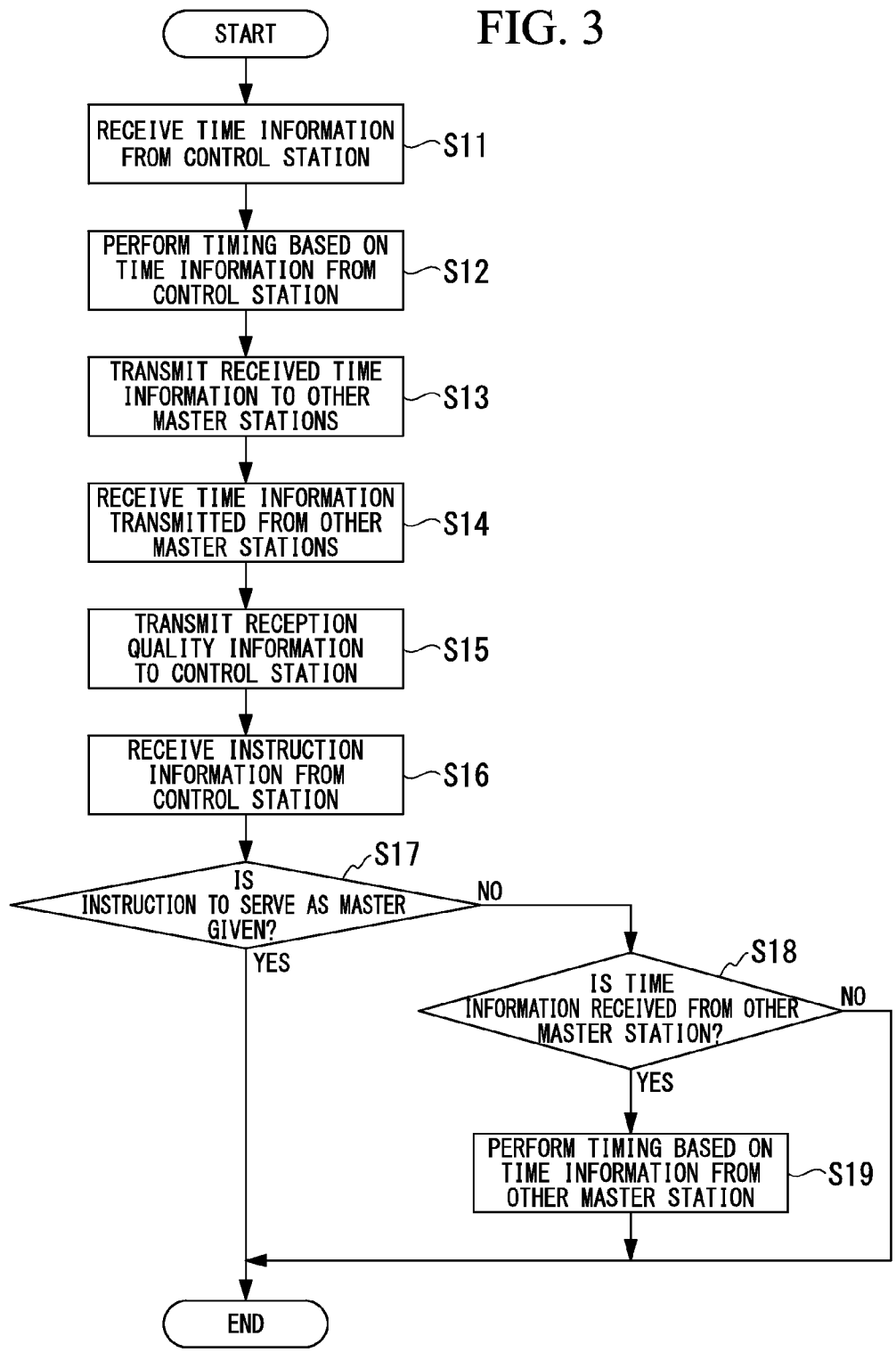
FIG. 3 is a flowchart illustrating an operation of the master station serving as the communication device in accordance with the first embodiment of the present invention.

Next, an operation of the communication system having the foregoing configuration will be described. FIG. 3 is a flowchart illustrating the operation of the master station serving as the communication device in accordance with the first embodiment of the present invention. The flowchart illustrated in FIG. 3 is a flowchart illustrating a process associated with the timing of the master stations 12a and 12b that starts when the time information T1 is transmitted from the control station 13 and is received via the backbone network N2.

(Step S11)

First, when the time information T1 is transmitted from the control station 13, the time information T1 is input to the master stations 12a and 12b via the backbone network N2 and is received by the communication device 22 of each of the master stations 12a and 12b. Here, since the backbone network N2 is a network formed by general-purpose devices and in which asynchronous communication is performed, as described above, it should be noted that the time information T1 transmitted from the control station 13 is influenced by fluctuation in transmission delay and is not necessarily received simultaneously by the master stations 12a and 12b.

(Step S12)

When the time information T1 from the control station 13 is received, both of the master stations 12a and 12b perform the timing based on the time information T1. Specifically, in each of the master stations 12a and 12b, the time information T1 received by the communication device 22 is read to the control device 26 and the timing of the clock device 24 is performed based on the read time information T1 by the synchronization-processing unit 26a included in the control device 26. Since the time information T1 from the control station 13 may not necessarily be received simultaneously by the master stations 12a and 12b, as described above, the times of the master stations 12a and 12b are not necessarily synchronized with high accuracy through the synchronization process performed here.

(Step S13)

Next, a process of transmitting the time information T1 received from each of the master stations 12a and 12b as announcement information to the other master stations (the master stations 12b and 12a) or the slave stations 11a to 11c via the wireless communication network N1 is performed. Specifically, in each of the master stations 12a and 12b, the wireless communication device 21 is controlled by the control device 26 and the time information T1 read from the communication device 22 is transmitted as the announcement information T2 and the announcement information T3 to the wireless communication network N1.

(Step S14)

Next, a process of mutually receiving the announcement information transmitted from the other master stations (the master stations 12b and 12a) to the wireless communication network N1 is performed by each of the master stations 12a and 12b. Specifically, the announcement information T3 transmitted from the master station 12b is received by the wireless communication device 21 of the master station 12a and the announcement information T2 transmitted from the master station 12a is received by the wireless communication device 21 of the master station 12b.

When the foregoing processes end, a process of calculating the reception quality information indicating reception qualities of the announcement information T3 and the announcement information T2 received by each of the master stations 12a and 12b is performed. Specifically, in each of the master stations 12a and 12b, the reception quality information calculation unit 26b included in the control device 26 calculates the reception quality information of which the value is changed according to whether the announcement information T2 and the announcement information T3 are received or according to the magnitude of the reception power or the error rate.

(Step S15)

The reception quality information calculated in each of the master stations 12a and 12b is transmitted to the control station 13 by allowing the control device 26 to control the communication device 22.

When the reception quality information is received from the master stations 12a and 12b, the control station 13 determines which master station serves as a master or a slave between the master stations 12a and 12b based on the reception quality information and transmits instruction information indicating that the master station will serve as the master and the instruction information indicating that the master station will serve as the slave via the backbone network N2. Here, the master station 12a is assumed to be instructed to serve as the master and the master station 12b is assumed to be instructed to serve as the slave.

(Step S16)

The instruction information transmitted from the control station 13 and arriving via the backbone network N2 is received by the communication device 22 included in each of the master stations 12a and 12b.

(Step S17)

The control device 26 included in each of the master stations 12a and 12b determines whether the received instruction information is the instruction information indicating that the master station will serve as the master. Here, since the master station 12a is assumed to be instructed to serve as the master and the master station 12b is assumed to be instructed to serve as the slave, the determination result of the control device 26 included in the master station 12a is "YES" and the determination result of the control device 26 included in the master station 12b is "NO."

When the determination result of the control device 26 included in the master station 12a is "YES," the process associated with the timing of the master station 12a ends. Accordingly, the clock device 24 included in the master station 12a successively achieves the timing based on the time information T1 from the control station 13 in step S12.

(Step S18)

Conversely, when the determination result of the control device 26 included in the master station 12b is "NO," the control device 26 included in the master station 12b determines whether the announcement information from the master station 12a, which is the other master station, is received.

(Step S19)

When it is determined that the announcement information from the master station 12a is received (the determination result of step S18 is "YES"), the synchronization-processing unit 26a included in the control device 26 of the master station 12b performs the timing of the clock device 24 based on the announcement information T2 transmitted from the master station 12a, and then the process associated with the timing of the master station 12b ends. Accordingly, the clock device 24 included in the master station 12b successively achieves the timing based on the announcement information T2 transmitted from the master station 12a.

Conversely, when it is determined that the announcement information from the master station 12a is not received (the determination result of step S18 is "NO"), the process of step S19 is not performed and the process associated with the timing of the master station 12b ends. Accordingly, in this case, the clock device 24 included in the master station 12b successively achieves the timing based on the time information T1 from the control station 13 in step S12.

When the foregoing series of processes ends, the master station 12a instructed to serve as the master synchronizes with the time information T1 from the control station 13 and the master station 12b instructed to serve as the slave operates in synchronization with the announcement information T2 from the master station 12a. After the process of the timing is completed, for example, a case in which the master station 12b instructed to serve as the slave may not receive the announcement information T2 from the master station 12a instructed to serve as the master, for example, due to a change in a communication environment, is considered. In this case, the master station 12b instructed to serve as the slave preferably performs the timing based on the time information T1 from the control station 13.

However, the time information T1 from the control station 13 is influenced by the fluctuation in the transmission delay. Therefore, even when the timing of the master station 12b is performed based on the time information T1, the master station 12b is not necessarily synchronized with the master station 12a with high accuracy. Further, even when the announcement information T2 from the master station 12a instructed to serve as the master is not receivable, a case in which the announcement information T2 is receivable again in a short time can be considered. Therefore, when the announcement information T2 is not receivable, the timing is not performed immediately based on the time information T1 from the control station 13. When the announcement information T2 is not receivable during a given period, the timing is preferably performed based on the time information T1 from the control station 13.

Specifically, when the master station 12b instructed to serve as the slave may not receive the announcement information T2 from the master station 12a during a time determined according to a time error (a time error occurring when the timing is not performed) occurring in the clock device 24 included in the slave station and a time accuracy obtained in advance, the timing is preferably performed based on the time information T1 from the control station 13. For example, when the time accuracy obtained in advance is 1 msec and 10 seconds has passed after the timing is performed on the assumption that the time error occurring in the clock device 24 is 0.1 msec per second, the time error occurring in the clock device 24 may be larger than the time accuracy obtained in advance. Therefore, when 10 seconds is measured by the timer device 25 from the time point at which the announcement information T2 from the master station 12a is not receivable, the synchronization-processing unit 26a preferably performs the timing based on the time information T1 from the control station 13.

In this embodiment, as described above, when the time information T1 is transmitted from the control station 13, both of the master stations 12a and 12b perform the timing in advance based on the time information T1, and the master station 12b instructed to serve as the slave by the control station 13 performs the timing based on the announcement information T2 transmitted from the master station 12a instructed to serve as the master via the wireless communication network N1. Therefore, even when the time information T1 transmitted from the control station 13 in the backbone network N2 connecting the control station 13 to the master stations 12a and 12b is influenced by the fluctuation in the transmission delay, the master stations 12a and 12b can be synchronized with accuracy necessary in the wireless communication network N1. Thus, in the communication system 1 according to this embodiment, it is possible to synchronize the times of the plurality of master stations 12a and 12b with high accuracy without a considerable increase in cost.

In the foregoing embodiment, the example in which both of the master stations 12a and 12b perform the timing in advance based on the time information T1 from the control station 13 (step S12) and the master station 12b serving as the slave at the time of the reception of the announcement information T2 from the master station 12a serving as the master performs the timing based on the announcement information T2 from the master station 12a serving as the master has been described. However, both of the master stations 12a and 12b may not necessarily perform the process (the process of step S12) of performing the timing in advance based on the time information T1 from the control station 13. For example, the master station 12a serving as the master may first perform the timing based on the time information T1 from the control station 13 after the transmission of the instruction information from the control station 13, and the master station 12b serving as the slave may perform the timing based on the announcement information T2 from the master station 12a serving as the master.

Second Embodiment

Figure 4:
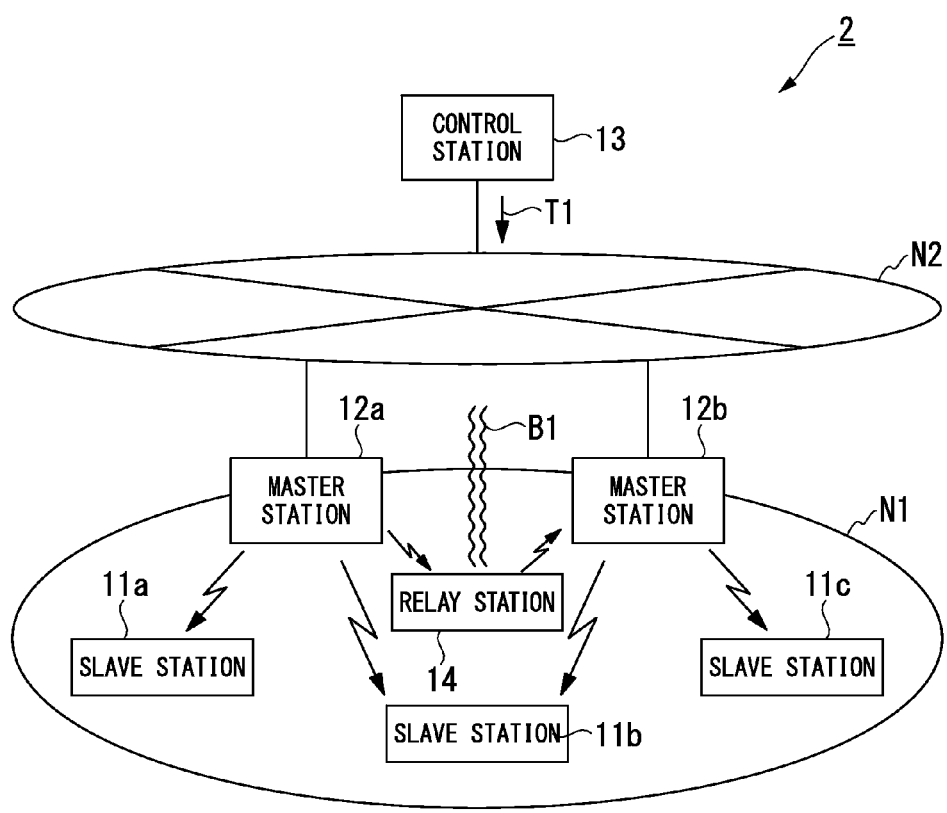
FIG. 4 is a diagram illustrating an overall configuration of a communication system in accordance with a second embodiment of the present invention.

FIG. 4 is a diagram illustrating an overall configuration of a communication system in accordance with a second embodiment of the present invention. As illustrated in FIG. 4, a communication system 2 according to this embodiment includes a relay station 14 (relay device) in addition to the plurality of slave stations 11a to 11c, the plurality of master stations 12a and 12b, and the control station 13 included in the communication system 1 illustrated in FIG. 1. The relay station 14 is a device that relays communication between the master stations 12a and 12b via a wireless communication network N1.

The master stations 12a and 12b may not perform direct communication due to a barrier B1 between the master stations 12a and 12b. However, by providing the relay station 14, communication can be performed between the master stations 12a and 12b via the relay station 14. Therefore, even when the barrier B1 is between the master stations 12a and 12b, one (for example, the master station 12b) of the master stations 12a and 12b can be synchronized with the other (for example, the master station 12a) of the master stations 12a and 12b.

The relay station 14 may be a dedicated device that has a function of relaying communication between the master stations 12a and 12b, or may be a device that also has other functions in addition to the function of relaying communication between the master stations 12a and 12b. For example, the relay station 14 may be a slave station serving as a wireless field device that has both of a measurement function of a fluid meter or the like and the function of relaying communication between the master stations 12a and 12b.

The communication system 2 according to this embodiment is the same as the communication system 1 according to the first embodiment except that the communication between the master stations 12a and 12b is performed via the relay station 14. Therefore, even when time information T1 transmitted from the control station 13 is influenced by fluctuation in transmission delay in a backbone network N2 connecting the control station 13 to the master stations 12a and 12b, as in the communication system 1 according to the first embodiment, the master stations 12a and 12b can be synchronized with accuracy necessary in the wireless communication network N1. Thus, in the communication system 2 according to this embodiment, it is also possible to synchronize the times of the plurality of master stations 12a and 12b with high accuracy without a considerable increase in cost.

Third Embodiment

Figure 5:
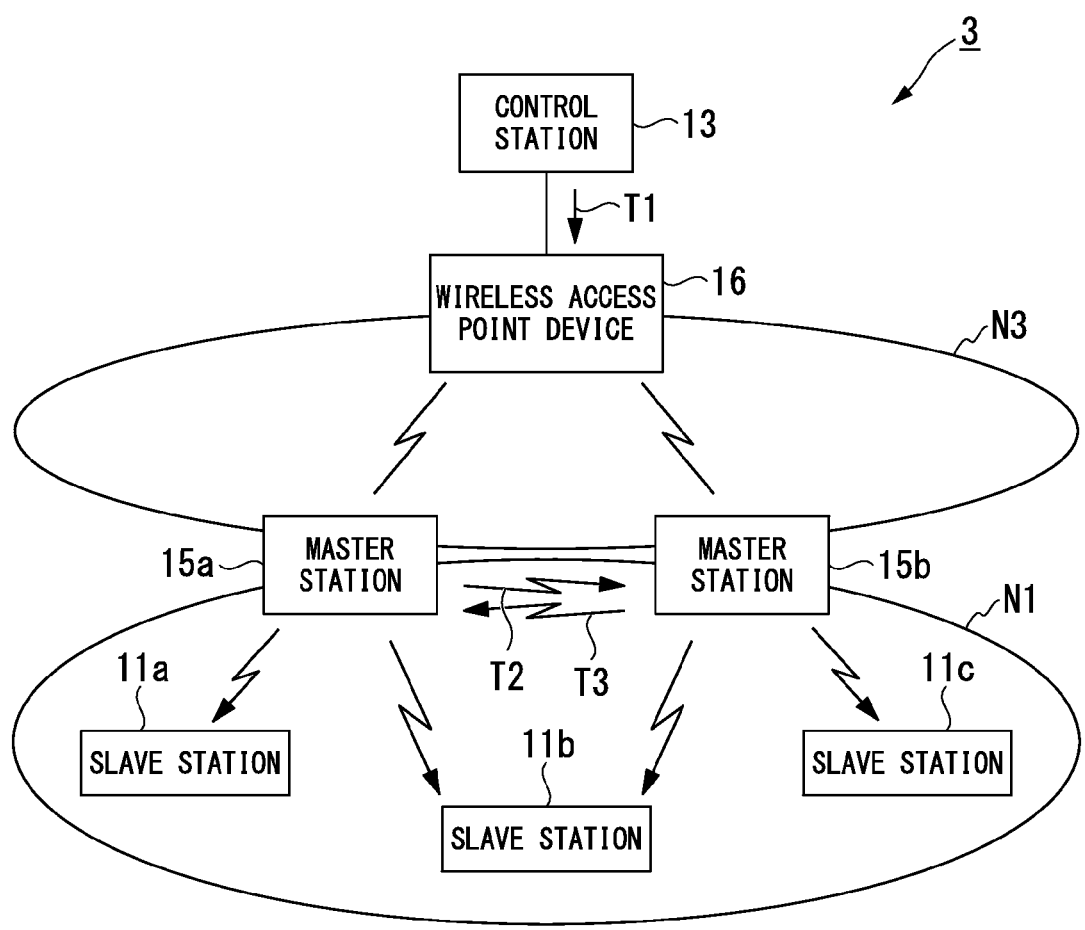
FIG. 5 is a diagram illustrating an overall configuration of a communication system in accordance with a third embodiment of the present invention.

FIG. 5 is a diagram illustrating an overall configuration of a communication system in accordance with a third embodiment of the present invention. As illustrated in FIG. 5, the communication system 3 according to this embodiment is a communication system that has a configuration in which a plurality of master stations 15a and 15b are provided instead of the plurality of master stations 12a and 12b included in the communication system 1 illustrated in FIG. 1, a wireless access point device 16 is added, and the backbone network N2 is realized as a wireless communication backbone network N3 (second network).

The master stations 15a and 15b can perform wireless communication in conformity with a wireless LAN standard such as IEEE 802.11 as well as wireless communication in conformity with a wireless communication standard such as the foregoing ISA100.11a. That is, each of the master stations 15a and 15b includes a wireless communication unit (a second communication unit not illustrated) that performs wireless communication in conformity with a wireless LAN standard such as IEEE 802.11, instead of the communication device 22 illustrated in FIG. 2. The master stations 15a and 15b having this configuration realize various kinds of communication with the slave stations 11a to 11c by forming a wireless communication network N1 in which wireless communication is performed according to, for example, a time-division multiplexing communication scheme and perform various kinds of communication with the control station 13 via the wireless communication backbone network N3 and the wireless access point device 16.

The wireless access point device 16 is a device that is connected to the control station 13 and relays various kinds of data transmitted and received between the control station 13 and the master stations 15a and 15b by forming the wireless communication backbone network N3 with the master stations 15a and 15b. The wireless access point device 16 also performs wireless communication in conformity with the foregoing wireless LAN standard such as IEEE 802.11.

The communication system 3 according to this embodiment is the same as the communication system 1 according to the first embodiment except that the communication between the control station 13 and the master stations 15a and 15b is performed via the wireless communication backbone network N3 and the wireless access point device 16. Therefore, even when time information T1 transmitted from the control station 13 is influenced by fluctuation in transmission delay in the wireless communication backbone network N3 connecting the control station 13 to the master stations 15a and 15b, as in the communication system 1 according to the first embodiment, the master stations 15a and 15b can be synchronized with accuracy necessary in the wireless communication network N1. Thus, in the communication system 3 according to this embodiment, it is also possible to synchronize the times of the plurality of master stations 15a and 15b with high accuracy without a considerable increase in cost.

The communication system, the communication device, and the communication method according to the embodiments of the present invention have been described above. However, the present invention is not limited to the foregoing embodiments and modifications can be made freely within the present invention. For example, in the foregoing first to third embodiments, the example in which the communication system includes two master stations (the master stations 12a and 12b or the master stations 15a and 15b) has been described. However, the present invention is applicable also when three or more master stations are included. In this case, when one of the plurality of installed master stations is instructed to serve as a master and the remaining master stations are instructed to serve as slaves, the plurality of master stations instructed to serve as the slaves are synchronized with the one master station instructed to serve as the master.

INDUSTRIAL APPLICABILITY

The communication system, the communication device, and the communication method according to the present invention can be broadly applied, and thus it is possible to synchronize times of the plurality of master stations with high accuracy without a considerable increase in cost.

DESCRIPTION OF THE REFERENCE SYMBOLS 1 to 3 Communication systems
11a to 11c: Slave stations
12a: Master station (first master station, communication device)
12b: Master station (second master station, communication device)
13: Control station
14: Relay station (relay device)
15a: Master station (first master station, communication device)
15b: Master station (second master station, communication device)
16: Wireless access point device
21: Wireless communication device (first communication unit)
22: Communication device (second communication unit)
24: Clock device
25: Timer device
26: Control device
26a: Synchronization-processing unit
26b: Reception quality information calculation unit
B1: Barrier
N1: Wireless communication network (first network)
N2: Backbone network (second network)
N3: Wireless communication backbone network (second network)
T1: Time information
T2, T3: Announcement information

What is claimed is:

1. A communication system, comprising:
first and second master stations configured to perform synchronous wireless communication with a slave station via a first network; and
a control station configured to be connected to the first and second master stations via a second network,
wherein the control station transmits time information used to synchronize times of the first and second master stations to each of the first and second master stations via the second network,
wherein one of the first and second master stations that is instructed to serve as a master by the control station performs timing based on the time information from the control station, and
wherein the other of the first and second master stations that is instructed to serve as a slave by the control station performs the timing based on announcement information announcing the time information transmitted from the one of the first and second master stations, which is instructed to serve as the master by the control station, via the first network.

2. The communication system according to claim 1, wherein, when the first and second master stations receive the time information from the control station, the first and second master stations transmit the announcement information to the second and first master stations via the first network, respectively, and receive the announcement information transmitted from the second and first master stations via the first network, respectively.

3. The communication system according to claim 2, wherein the first and second master stations transmit reception quality information indicating reception quality of the announcement information transmitted from the second and first master stations via the first network, respectively, to the control station via the second network, and
wherein, based on the reception quality information from the first and second master stations, the control station instructs the first and second master stations to serve as a master that performs the timing based on the time information from the control station or to serve as a slave performing the timing based on the announcement information.

4. The communication system according to claim 1, wherein, when the other of the first and second master stations does not receive the announcement information from one of the first and second master stations, the other of the first and second master stations performs the timing based on the time information from the control station.

5. The communication system according to claim 4, wherein, when the other of the first and second master stations is not able to receive the announcement information from the one of the first and second master stations during a time determined according to a time error occurring when the timing is not performed and time accuracy obtained in advance, the other of the first and second master stations performs the timing based on the time information from the control station.

6. The communication system according to claim 1, further comprising:
a relay device configured to relay communication performed via the first network between the first and second master stations.

7. A communication device that is instructed to serve as one of a master and a slave by a control station, comprising:
a first communication unit configured to be connected to a first network in which synchronous wireless communication is enabled;
a second communication unit configured to be connected to a second network in which asynchronous communication is enabled;
a clock device configured to regulate a time of the own communication device; and
a synchronization-processing unit, wherein, when the communication device is instructed to serve as the master, the synchronization-processing unit performs a first process of performing timing of the clock device based on time information received by the second communication unit and when the communication device is instructed to serve as the slave, the synchronization-processing unit performs a second process of performing the timing of the clock device based on announcement information of the time information received by the first communication unit, the announcement information being information announced by another communication device via the first network.

8. The communication device according to claim 7, wherein the synchronization-processing unit performs one of the first and second processes based on instruction information received by the second communication unit.

9. The communication device according to claim 8, wherein, when the instruction information received by the second communication unit is information for instruction of the second process and the first communication unit is not able to receive the announcement information, the synchronization-processing unit performs the first process instead of the second process.

10. A communication method in a communication system including first and second master stations configured to perform synchronous wireless communication with a slave station via a first network, and a control station configured to be connected to the first and second master stations via a second network, the communication method comprising:
transmitting time information used to synchronize times of the first and second master stations from the control station to each of the first and second master stations via the second network,
performing, by one of the first and second master stations that is instructed to serve as a master by the control station, timing based on the time information from the control station, and
performing, by the other of the first and second master stations that is instructed to serve as a slave by the control station, the timing based on announcement information announcing the time information transmitted from the one of the first and second master stations, which is instructed to serve as the master by the control station, via the first network.

11. The communication method according to claim 10, further comprising:
transmitting the announcement information to the second and first master stations via the first network, respectively, and receiving the announcement information transmitted to the second and first master stations via the first network, respectively, when the time information is received from the control station.

12. The communication method according to claim 11, further comprising:
transmitting reception quality information indicating reception quality of the announcement information transmitted from the second and first master stations via the first network, respectively, to the control station via the second network; and
instructing, based on the reception quality information from the first and second master stations, the first and second master stations to serve as a master that performs the timing based on the time information from the control station or to serve as a slave performing the timing based on the announcement information.

13. The communication method according to claim 10, further comprising:
performing, by the other of the first and second master stations, the timing based on the time information from the control station when the other of the first and second master stations does not receive the announcement information from one of the first and second master stations.

14. The communication system according to claim 1, wherein the first and second master stations perform, based on instruction information from the control station, one of the timing based on the time information from the control station and the timing based on the announcement information.

15. The communication method according to claim 10, further comprising:
performing, based on instruction information from the control station, one of the timing based on the time information from the control station and the timing based on the announcement information.

* * * * *